United States Patent [19]

Stephan

[11] Patent Number: 5,170,169

[45] Date of Patent: Dec. 8, 1992

[54] QUASI-OPTICAL TRANSMISSION/REFLECTION SWITCH AND MILLIMETER-WAVE IMAGING SYSTEM USING THE SAME

[75] Inventor: Karl D. Stephan, Belchertown, Mass.

[73] Assignee: Millitech Corporation, South Deerfield, Mass.

[21] Appl. No.: 709,036

[22] Filed: May 31, 1991

[51] Int. Cl.$^5$ .................. G01S 13/89; H01P 1/15
[52] U.S. Cl. .................. 342/179; 333/21 A; 333/262; 343/909
[58] Field of Search .................. 333/103, 21 A, 258, 333/262; 343/756, 909

[56] References Cited

U.S. PATENT DOCUMENTS

| | | | |
|---|---|---|---|
| 3,708,796 | 1/1973 | Gilbert | 343/754 |
| 3,979,703 | 9/1976 | Craven | 333/258 |
| 4,266,203 | 5/1981 | Saudreau et al. | 333/21 A |
| 4,344,077 | 8/1982 | Chekroun et al. | 343/909 X |
| 4,518,966 | 5/1985 | Sadones | 343/909 X |
| 4,531,126 | 7/1985 | Sadones | 343/909 X |
| 4,581,250 | 4/1986 | Armstrong et al. | 427/88 |
| 4,598,262 | 7/1986 | Chen | 333/21 A X |
| 4,652,891 | 3/1987 | Bossuet et al. | 343/756 X |
| 4,684,954 | 8/1987 | Sureau et al. | 343/909 |
| 4,754,243 | 6/1988 | Armstrong et al. | 333/250 |
| 4,949,093 | 8/1990 | Dhanjal | 343/909 X |
| 5,047,783 | 9/1991 | Hugenin | 342/179 |
| 5,055,805 | 10/1991 | Kan | 333/21 A |

OTHER PUBLICATIONS

Armstrong et al., *High-Power Waveguide Diode-Array-Switch Element*, MSN & CT, Nov. 1987, pp. 8,9,12,14 & 19.
J. A. Arnaud and F. A. Pelow, "Resonant-Grid Quasi-Optical Diplexers", *The Bell System Technical Journal*, Feb., 1975, pp. 263–283.
Claude Chekroun, D. Herrick, Yves Michel, R. Pauchard, and P. Vidal, "Radiant: New Method of Electronic Scanning", *Microwave Journal*, Feb., 1981, pp. 45–53.
Richard H. Park, "Radiant Lens: Alternative to Expensive Phased Arrays", *Microwave Journal*, Sep. 1981, pp. 101–105.
Wayne W. Lam, Christina F. Jou, N. C. Luhmann, Jr., and David B. Rutledge, "Diode Grids for Electronic Beam Steering and Frequency Multiplication", *International Journal of Infrared and Millimeter Waves*, vol. 7, No. 1, 1986, pp. 27–41.
David B. Rutledge, Zoya Basta Popovoic, Robert M. Weile, II, Moonil Kim, Kent A. Potter, Richard C. Compton, and Robert A. York, "Quasi-Optical Power Combining Arrays", *IEEE MTT-S Digest, 1990, pp. 1201–1204*.

*Primary Examiner*—Paul Gensler
*Attorney, Agent, or Firm*—Pennie & Edmonds

[57] ABSTRACT

An apparatus for the selective transmission or reflection of incident electromagnetic radiation. The apparatus comprises a plurality of dielectric substrates combined so as to form a stack, wherein at least two of the substrates comprise conductive elements extending in first and second directions on a surface of the substrates and at least one of the substrates includes diodes which connect adjacent conductive elements in at least the first direction. The apparatus is electronically controllable between a reflection mode and a transmission mode, wherein in the reflection mode the diodes are reverse-biased and electromagnetic radiation incident on the apparatus is substantially reflected and in the transmission mode the diodes are forward-biased and incident electromagnetic radiation is substantially transmitted. The physical dimensions of the conductive elements of the substrate comprising the diodes is such that in the reflection mode, the apparatus substantially appears as a perfect conductor with respect to the incident energy.

42 Claims, 13 Drawing Sheets

QUASI-OPTICAL TRANSMISSION/REFLECTION SWITCH AND MILLIMETER-WAVE IMAGING SYSTEM USING THE SAME

FIELD OF THE INVENTION

This invention relates to an apparatus for the selective reflection or transmission of electromagnetic radiation within the microwave or millimeter regime, commonly referred to as the "quasi-optical" regime.

CROSS-REFERENCE TO RELATED APPLICATION

This application is related to U.S. patent application Ser. No. 07/495,879 issued on Sep. 10, 1991 as U.S. Pat. No. 5,047,783, which is incorporated herein by reference.

BACKGROUND OF THE INVENTION

In microwave and millimeter-wave systems, transmission of quasi-optical electromagnetic radiation is typically accomplished by use of conventional guided-wave conductors, such as a waveguide or microstrip, or by free-space transmission. These systems frequently employ electronically controllable devices that provide the capability of either selectively reflecting or transmitting quasi-optical radiation, but not both. While mechanical switching devices capable of switching between transmission and reflection modes are available, an electronically controllable switch is highly desirable for various imaging and processing applications.

An example of a system in which such a switching capability would be desirable is the millimeter-wave imaging system disclosed in U.S. patent application Ser. No. 07/495,879, now U.S. Pat. No. 5,047,783. This system employs a receiver array for receiving millimeter wave signals and for generating images of a selected field of view. To reduce noise and thereby improve image quality, a noise calibration signal from a uniform load is subtracted from the signal emanating from the desired field of view. For this reason, the system alternates the beam incident on the receiver array between the beam radiating from the field of view and the beam radiating from the uniform load. This alternation between energy sources is accomplished by the coaction between a polarizing grid and a mechanically rotatable polarization element located in the path of the beams from the field of view and the uniform load. The grid reflects radiation polarized in one direction and transmits radiation polarized in a direction perpendicular thereto. The grid is positioned so that it transmits the uniform load radiation and reflects the field of view radiation in the direction of the polarization element and the receiver array. Accordingly, energy radiating from the uniform load and reflected energy radiating from the field of view are polarized in orthogonal directions with respect to one another. The polarization element is aligned to pass radiation oriented in one of these directions. However by rotating the polarization element by 90°, the polarization element passes the radiation polarized in the second direction. As a result, if the polarization element is continuously rotated, the array alternately detects radiation from the field of view and radiation from the uniform load.

An electronically controllable device that selectively transmits incident radiation from one source or another would significantly simplify this apparatus, permitting the elimination of the rotating polarization grid as well as the mechanism for rotating it.

Presently, electronically controllable devices have been developed only for phase-shifting or deflecting quasi-optical electromagnetic energy. In some of these devices, the phase-shifting or deflecting capabilities are provided by a grid of wires embedded in a dielectric, wherein the wires are divided into sections by switches, such as diodes. An overview of such prior devices is provided below.

U.S. Pat. No. 3,708,796 issued to Gilbert relates to a dielectric panel for phase-shifting an electromagnetic beam travelling via free space by interposing one or several of the dielectric panels in the path of the beam. Each panel comprises conductive leads running parallel with the electric field vector of the incident wave. The leads are connected by silicon diodes and can either be electrically divided into sections or electrically connected along the length of the panel depending on the bias state of the diodes. The distance between the sections of the leads is such that a wave incident on the panel does not induce any current in the leads. According to Gilbert, this results in a substantial phase shift of the incident wave as it traverses the panel. Further, the disclosed panel has a thickness which is a multiple of a half wavelength of the incident wave, so as to prevent any back-reflection of the incident wave. Thus, the '796 patent does not disclose a means of reflecting an electromagnetic beam. On the contrary, the panels are designed so as to prevent reflections. As will become apparent, the absence of any reflection capability is one distinguishing feature from the present invention.

Chekroun et al., "Radant: New Method of Electronic Scanning", *Microwave Journal*, pp. 45-53 (Feb. 1981) and Park, "Radant Lens: Alternative to pensive Phased Arrays", *Microwave Journal*, pp. 101-105 (Sept. 1981) both describe a lens comprising a grid of wires, which is capable of electronically varying the phase of an electromagnetic beam incident on the lens. The wires are separated into sections by PIN diodes. The phase of the beam transmitted through the lens is varied by varying the DC bias of the diodes. The lens is functionally equivalent to the phase-shifting device disclosed in the '796 patent described previously. However, as with the '796 patent, these articles do not disclose a device for the selective reflection or transmission of an electromagnetic beam because the disclosed devices do not provide for the reflection of electromagnetic energy.

Lam et al., "Diode Grids for Electronic Beam Steering and Frequency Multiplication", *International Journal of Infrared and Millimeter Waver*, Vol. 7, No. 1, pp. 27-41 (1986) relates to two arrays comprising diode grids. The first array controls the phase shift of a wave reflected by the array so as to steer the reflected beam in a desired direction. This array comprises a fused-quartz cover, two diode grids and a metal mirror. A wave incident on the array is reflected and re-directed by controlling the phase shift of the reflected wave. The phase shift of the reflected wave is determined by the capacitance characteristic of the diodes in the grids, and this capacitance characteristic is controlled by varying the DC bias of the diodes. In the first array disclosed by Lam et al., there is a significant reflection loss of the incident radiation. The reflection efficiency of the beam steering array varies from 0.49 to 0.57, with an average loss of 2.7 dB. Furthermore, this array does not transmit electromagnetic energy through the array because any incident energy is always reflected by the metal mirror.

The second array described by Lam et al. generates the second harmonic of the fundamental frequency of an electromagnetic beam incident on the array. The second array comprises an input filter, a diode grid and an output filter. The input filter allows the transmission of the fundamental frequency and prevents the transmission of the second harmonic of the incident beam. The energy incident on the diode grid in conjunction with the non-linear capacitance of the diodes generates harmonics, whereby the output filter is tuned to allow the transmission of the second harmonic of the incident beam. This array does not permit the reflection of incident radiation. Thus, neither one of the arrays disclosed by Lam et al. can be employed to selectively reflect or transmit incident radiation.

U.S. Pat. No. 4,581,250 and U.S. Pat. No. 4,754,243 issued to Armstrong, et al. relate to a method of mounting a microwave semiconductor device in a radio-frequency (RF) waveguide, whereby a matrix of PIN diodes operates as a high power limiter. In a first state, the diode matrix allows for the transmission of energy through the waveguide and in a second state the diode matrix prevents the transmission of energy through the waveguide. However, the Armstrong patents do not disclose a state of device operation in which substantially all the energy incident on the diode matrix is reflected.

Although the aforementioned references relate to electronically controllable devices for manipulating an electromagnetic beam incident on a device, none of the above references disclose a device capable of reflecting substantially all of the incident electromagnetic radiation in a first state and transmitting the incident radiation in a second state.

Accordingly, there exists a present need for a device which provides for the transmission of electromagnetic radiation in one state and for the reflection of the energy in another state, wherein the device comprises means for electronically switching between the two states.

SUMMARY OF THE INVENTION

Accordingly, it is the principal object of the invention to provide a quasi-optical transmission/reflection switch capable of electronically alternating between different states, including a first state in which electromagnetic radiation is reflected by the switch and a second state in which the incident radiation is transmitted through the switch.

Another object of the present invention is to provide a quasi-optical polarizer capable of electronically alternating between orthogonal polarizations.

According to the present invention, an apparatus is provided for the transmission or reflection of electromagnetic radiation. The apparatus is electronically controllable between two states of operation, an OFF state and an ON state. In the OFF state, the apparatus preferably reflects substantially all of the electromagnetic radiation incident on the apparatus and in the ON state the apparatus transmits the incident electromagnetic radiation.

In the preferred embodiment, the apparatus comprises three dielectric substrates, an active grid substrate, a passive grid substrate and a spacer substrate. The three substrates are combined so as to form a stack, wherein a rear surface of the active grid substrate is attached to a front surface of the spacer substrate and a rear surface of the spacer substrate is attached to a front surface of the passive grid substrate.

Furthermore, the active grid substrate comprises conductive elements which are etched on a front surface of the substrate. The conductive elements form a pattern extending in first and second directions, wherein adjacent conductive elements in the first direction are connected by diodes and adjacent conductive elements in the second direction are connected by conductive traces. The passive grid substrate comprises conductive elements, wherein the pattern formed by the conductive elements is identical to the conductive element pattern of the active grid substrate. Additionally, adjacent conductive elements in the first direction of the passive grid substrate are interconnected, while adjacent conductive elements in the second direction of the pattern are not connected by conductive traces.

As previously mentioned, the apparatus has two states of operation, an OFF state in which incident radiation is reflected and an ON state in which incident radiation is transmitted. In the OFF state, the diodes of the active grid substrate are zero-biased or reverse-biased. Therefore, each diode can be represented by an equivalent circuit comprising a capacitance in series with a small resistance. According to the present invention, the physical dimensions of the conductive elements of the active grid substrate are selected such that, when the diodes are zero-biased or reverse-biased (OFF state) and a linearly polarized beam is incident on the substrate having an electric field vector parallel to the first direction (i.e., parallel to the diodes), the incident radiation induces a current which encounters an inductance component that cancels the capacitance component of the zero-biased or reverse-biased diodes. In the OFF state, the apparatus is hence substantially a perfect conductor with respect to the incident radiation, with substantially all of the incident radiation reflected.

In the ON state, the diodes of the active grid substrate are forward-biased. Therefore, each diode can be represented by an equivalent circuit comprising an admittance in the first direction. This admittance, by itself, would cause a portion of the incident radiation to be reflected. One method of canceling such reflections is to position the passive grid substrate having an identical admittance parallel to the first direction at a distance equal to one-quarter of the wavelength of the incident energy. For electromagnetic radiation reflected from the active and passive grid substrates, the optical path difference will be half of the wavelength, corresponding to a phase difference of 180°. Hence, when a linearly polarized radiation having an electric field vector parallel to the diodes is incident on the apparatus, the two reflected beams destructively interfere.

BRIEF DESCRIPTION OF THE DRAWINGS

These and other objects, features and advantages of the invention may be better understood by referring to the following detailed description, which should be read in conjunction with the accompanying drawings in which.

DETAILED DESCRIPTION OF THE DRAWINGS

The disclosure of the present invention proceeds in the following order. Section I discloses the preferred embodiment of the quasi-optical transmission/reflection switch. Section II discloses the functional operation of the quasi-optical transmission/reflection switch. Section III discloses one possible method of designing the quasi-optical transmission/reflection switch of the present invention. Section IV discloses the operation of a quasi-optical transmission/reflection switch in an imaging system. Finally, Section V discloses an alternative embodiment of the present invention.

Section I

While the proceeding description relates to an exemplary switch comprising an active grid, passive grid and dielectric spacer, it should be understood that a switch operating in accordance with principles of the invention may be fabricated utilizing only an active grid. It will be apparent to those skilled in the art from a reading of the following discussion that the spacer and the passive grid function to prevent unwanted back reflections from the active grid. The spacer and passive grid while improving the performance of the switch are, however, not critical to the operation of the switch. Accordingly, it should be understood that the quasi-optical switch shown in FIG. 1 is only for the purpose of illustration and not for the purpose of limitation.

Figure 1:
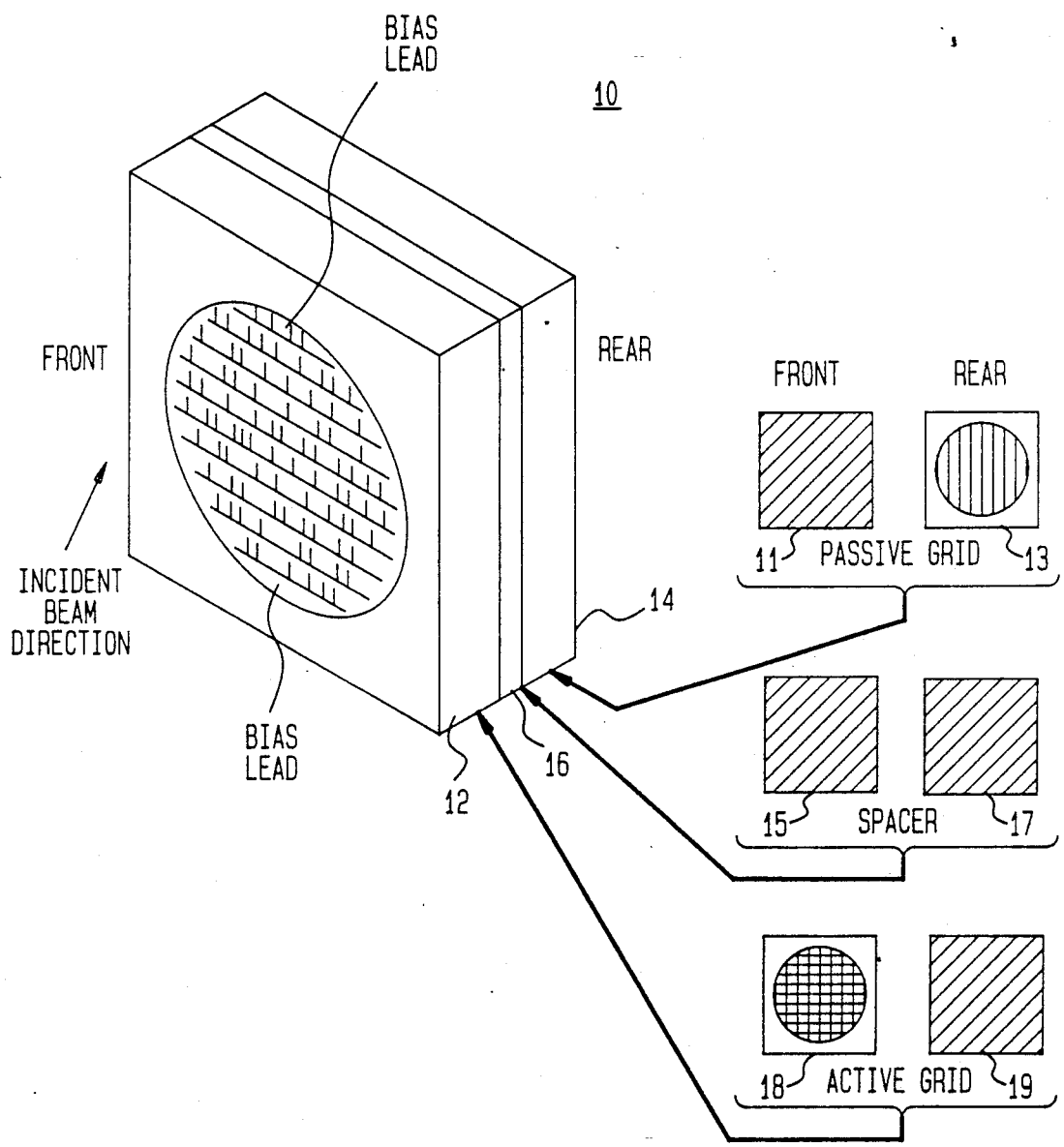
FIG. 1 is a diagrammatic illustration of the quasi-optical transmission/reflection switch of the present invention.

Thus, without any loss of generality or applicability for the principles of the invention, FIG. 1 depicts a quasi-optical switch 10, comprising active grid 12, passive grid 14, and dielectric spacer 16. Grids 12 and 14 and spacer 16 are individual substrates which form a stack in which spacer 16 separates the grids. The surfaces of the substrates are shown symbolically in FIG. 1. Front surface 18 of active grid 12 and rear surface 13 of passive grid 14 comprise conductive elements described in detail subsequently. As indicated, rear surface 19 of active grid 12 is attached to front surface 15 of spacer 16. Front surface 11 of passive grid 14 is attached to rear surface 17 of spacer 16.

It is contemplated that the three individual substrates (12, 14 and 16) can be replaced by one substrate having a first surface which is the same as front surface 18 of the active grid, and a second surface opposite the first surface, which is the same as rear surface 13 of passive grid 14.

Figure 2:
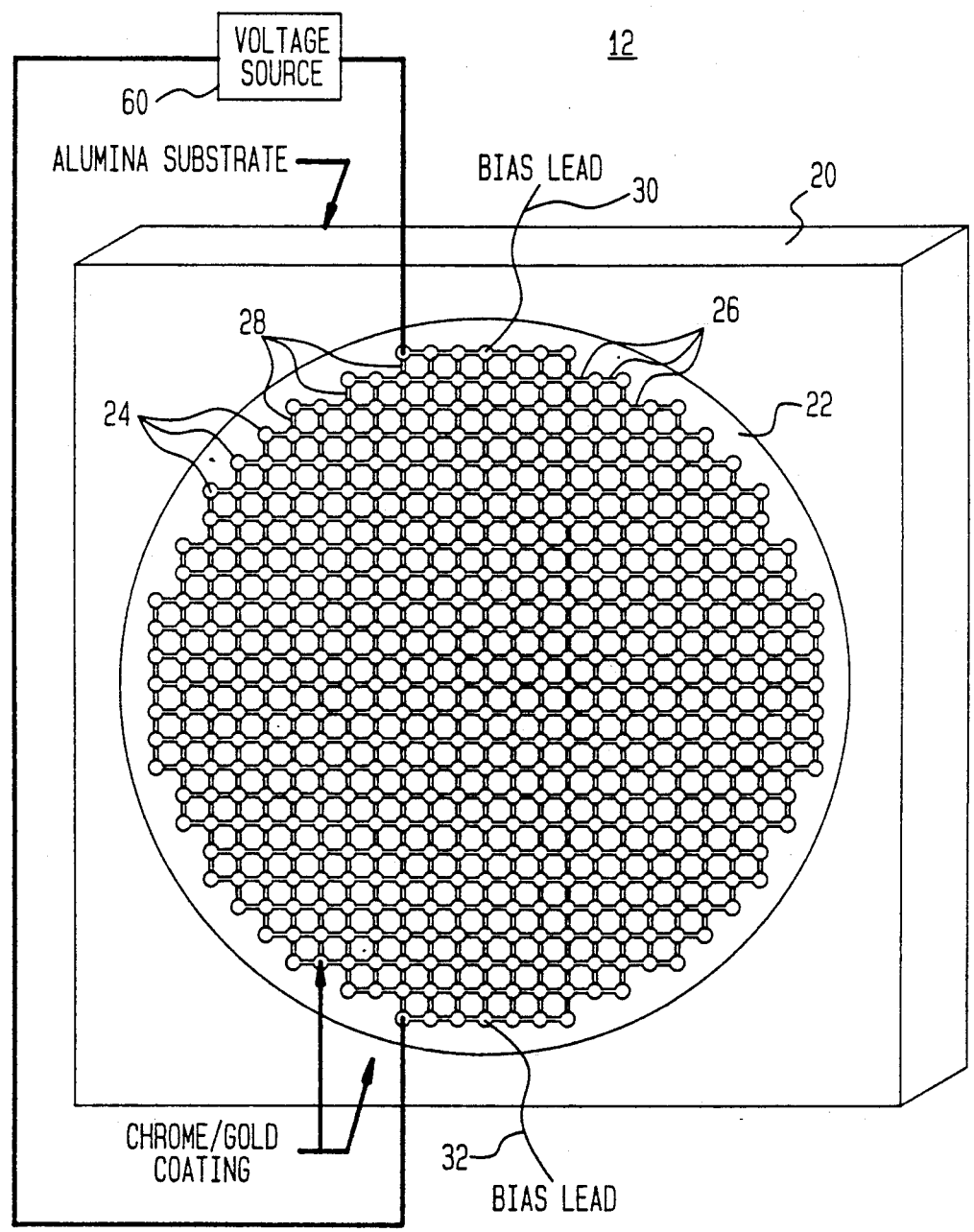
FIG. 2 is an illustration of a front surface of an active grid of the quasi-optical transmission/reflection switch.

FIG. 2 illustrates active grid 12 in further detail. Active grid 12 comprises dielectric substrate 20, which is made of a material such as alumina (i.e., $Al_2O_3$), and which is coated by a conductive material such as gold or chrome. Window 22 contains conductive elements 24 and traces 26 which are etched in the conductive material using a standard etching process known in the art. The etching process removes all of the conductive coating from substrate 20 within window 22, except for the conductive coating required to form conductive elements 24 and traces 26.

As shown in FIG. 2, conductive elements 24 are etched so as to form a pattern of rows and columns, wherein traces 26 electrically connect adjacent conductive elements 24 in the horizontal direction and diodes 28, such as PIN diodes, electrically connect adjacent conductive elements 24 in the vertical direction. Additionally, active grid 12 comprises bias leads 30 and 32 for voltage source 60 to apply a voltage potential or bias to diodes 28.

As will be apparent from Section III, it is highly desirable to lower the inductance of the mesh structure formed by conductive elements 24. It has been found that conductive elements 24 interconnected by traces 26 yield the optimum structure for minimizing the inductance. However, it is contemplated that other mesh patterns having non-interconnecting horizontal conductive elements 24 may be used.

Figure 3:
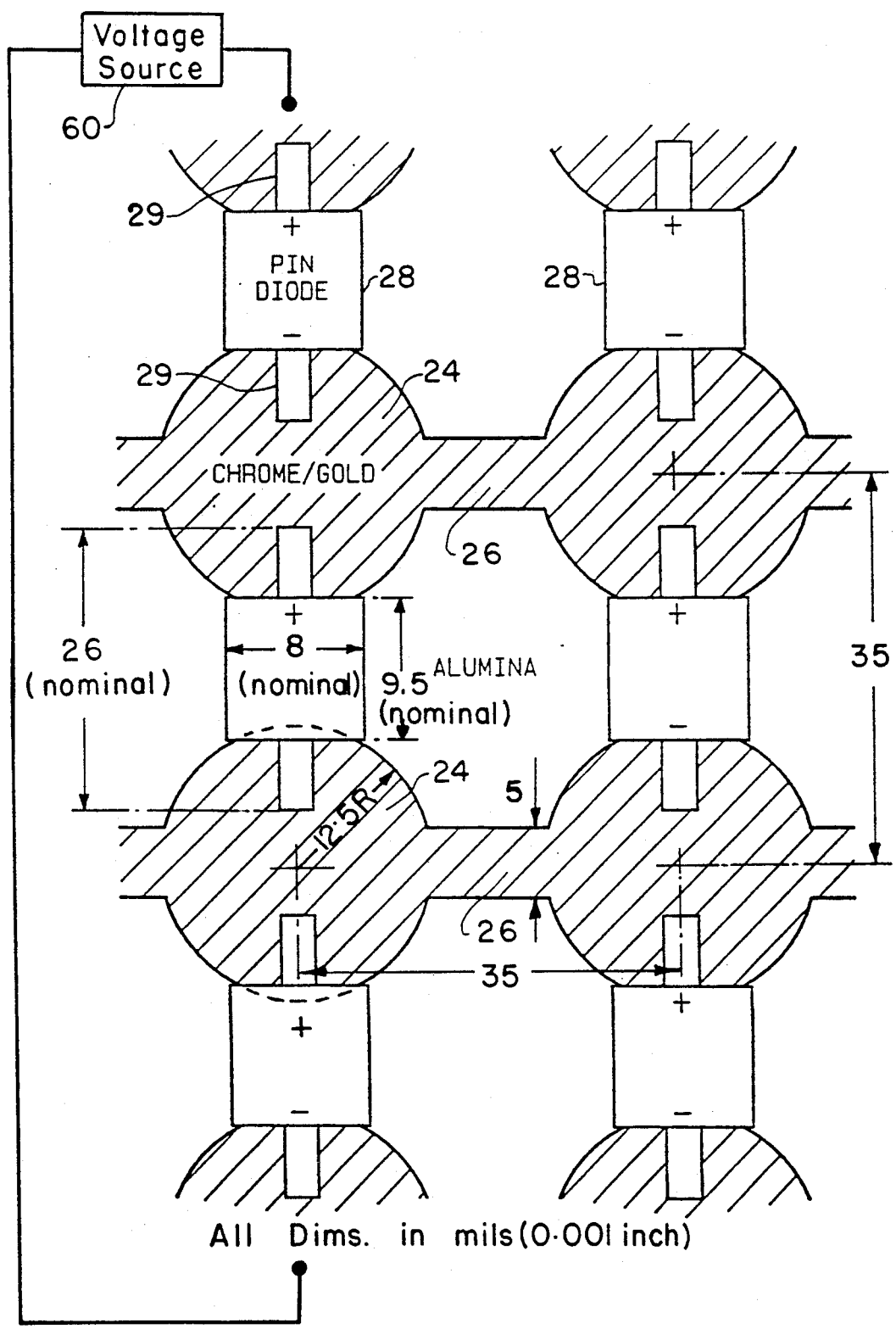
FIG. 3 is a magnified illustration of an exemplary portion of a grid pattern of the active grid.

FIG. 3 is a magnified illustration of an exemplary portion of the grid pattern depicted in FIG. 2. As illustrated, each diode 28 connects two vertically adjacent conductive elements 24 by means of diode leads 29, and traces 26 connect horizontally adjacent conductive elements thereby forming a two dimensional grid pattern. The diodes are bonded onto the dielectric substrate using techniques known in the art. As will be apparent, the diodes are mounted such that the positive and negative terminals of each diode are aligned in the same direction. Therefore, by applying a sufficient DC bias voltage to bias leads 30 and 32, every diode in the array can be appropriately forward biased. As a result, conductive elements 24 can be electrically connected in the vertical direction by either inductive elements or capacitive elements according to the diode bias.

Figure 4:
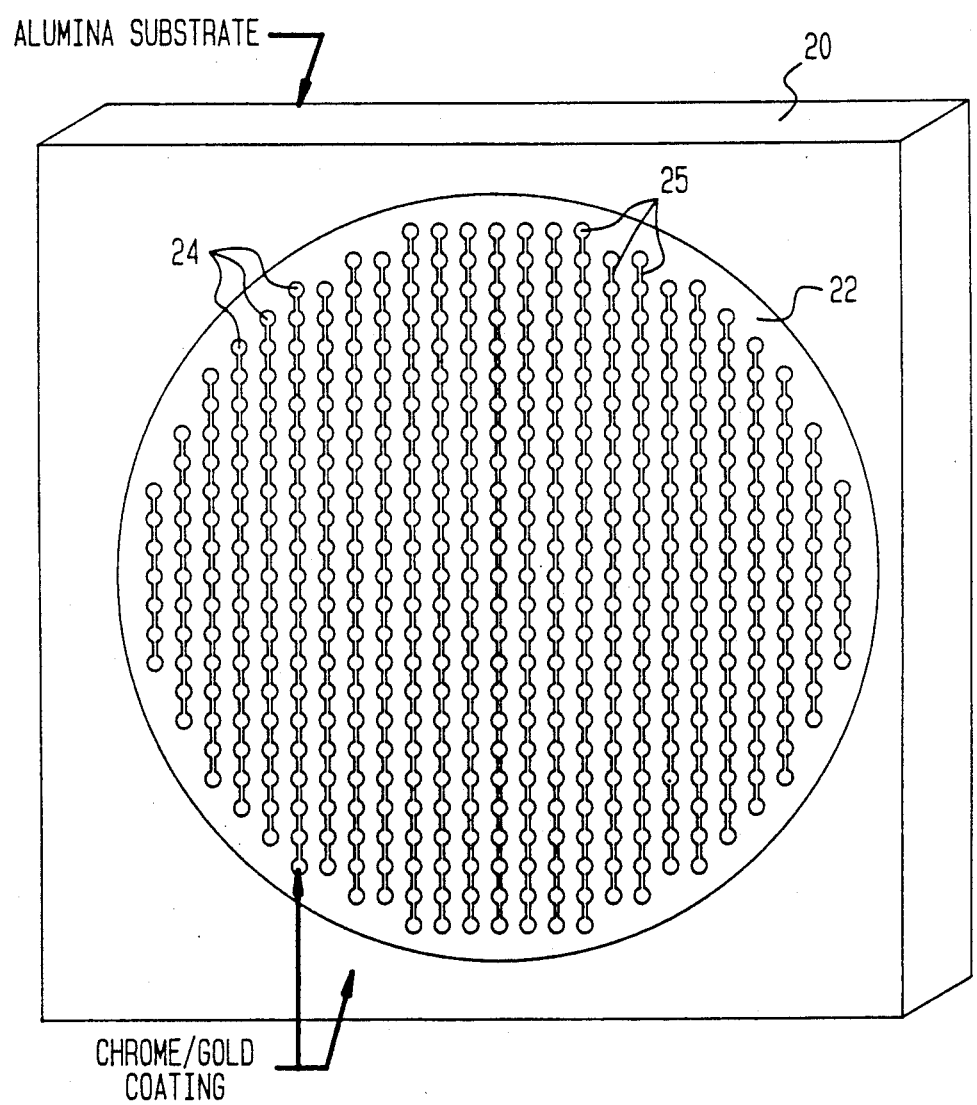
FIG. 4 is an illustration of a rear surface of a passive grid of the quasi-optical transmission/reflection switch.

As shown in FIG. 4, passive grid 14 comprises a window 22 and conductive elements 24, which are the same as the like-numbered elements of active grid 12, and traces 25. Conductive elements 24 of passive grid 14 are electrically connected by traces 25 in only one direction of the grid pattern which preferably is parallel to the direction of the diodes in the active grid. These traces have an inductance that approximates that of a turned-on diode so that the inductance per unit area of both grids are equal. The conductive elements are not connected in the second direction (i.e., the horizontal direction in FIG. 4).

Section II

Quasi-optical transmission/reflection switch 10 operates in either a reflection mode or a transmission mode. Linearly polarized radiation incident on switch 10 having an electric field vector parallel to the direction of the diodes (i.e., vertical for the grid depicted in FIG. 2) is either reflected by switch 10 or transmitted through the switch. The mode of operation of the switch is determined by the bias state of diodes 28 in active grid 12. In the reflection mode (OFF state), diodes 28 are zero-biased or reverse-biased so as to prevent current flow through the diodes and thereby cause the diodes to function as capacitive elements in the vertical direction. In the transmission mode (ON state), diodes 28 are forward-biased so as to allow current to flow through the diodes, causing the diodes to function as inductive elements.

Normally, when electromagnetic radiation reaches an interface between a first and second region, for example, the interface between free space and the quasi-optical switch of the present invention, the wave is partially reflected and partially transmitted. The percentage of the wave reflected is dependent upon the value of the intrinsic impedances of the two regions. If the intrinsic impedance of the second region is equal to zero (i.e., a perfect conductor), the wave incident on the second region is totally reflected into the first region and therefore no energy is transmitted into the second region. Thus, in the OFF state, quasi-optical switch 10 is designed to exhibit an intrinsic impedance approximately equal to zero in order to reflect substantially all of the incident energy.

According to the present invention, the electric field vector of the incident radiation is parallel to the direction of the diodes. Additionally, the diodes are reverse-biased or zero biased in the reflection mode. As a result, the reverse-biased (or zero-biased) diodes combined with the conductive elements of the active grid must exhibit an intrinsic impedance substantially equal to zero. Each conductive element has an intrinsic impedance substantially equal to zero. Each reverse-biased diode, however, can be represented by an equivalent circuit comprising a small capacitance in series with a small resistance. This capacitance results in a non-zero intrinsic impedance for the combined circuit (i.e., the diodes in series with the conductive elements) and must be canceled in order to substantially reflect incident radiation.

Linearly polarized incident radiation having an electrical field vector parallel to the direction of the diodes will induce current in the conductive elements and the diode leads. This induced current encounters an inductive reactance to the combined circuit. The amount of the inductive reactance is dependent on the physical dimensions of the conductive elements and diode leads.

Active grid 12 of the present invention is designed such that the capacitance component of the reverse-biased diodes resonates with the inductance of the combined circuit. At resonance, the intrinsic impedance component attributable to the capacitance of the reverse-biased diodes is canceled by the intrinsic impedance component attributable to the inductance. Therefore, at resonance, the active grid has a purely resistive impedance equal to the series resistance of the equivalent circuit of the reverse-biased diodes (i.e., substantially zero).

It is contemplated that the dimensions of the conductive elements of active grid 12 are selected such that, at resonance, the diode capacitance is completely canceled by the inductance and the active grid has an intrinsic impedance substantially equal to zero at the particular design frequency. At resonance active grid 12 therefore appears as a perfect conductor to vertically polarized radiation. Section V discusses in detail the interrelationship between the capacitance, inductance and the physical dimensions of active grid 12.

When the quasi-optical transmission/reflection switch is in the transmission mode, it is desirable to transmit all of the energy incident on the switch and thereby prevent any energy from being reflected by the switch. However, as previously described, the amount of energy reflected at an interface is dependent upon the intrinsic impedance of the two regions comprising the interface. For an interface comprising free space and a dielectric substrate which is not a perfect dielectric, there exists an inherent difference in the intrinsic impedance of the two regions, which results in a partial reflection of the incident wave (an interface comprising two regions having identical intrinsic impedance values would not reflect any portion of an incident wave). Therefore, as described below, the quasi-optical switch of the present invention comprises means for canceling the portion of energy which would otherwise be reflected when the switch is in the ON state.

In the ON state, PIN diodes 28 of the active grid are forward-biased (i.e., current can flow through the diodes). The forward-based diodes can be represented by an equivalent circuit comprising an inductance in series with a resistance. The value of the resistance is inversely proportional to the bias current. Thus, the equivalent circuit of the active grid in the ON state is an admittance. This admittance produces the aforementioned intrinsic impedance matching problem which results in a portion of the incident radiation to be reflected.

A solution to this impedance matching problem is to place a second structure having substantially the same admittance as the active grid at a distance of approximately a quarter of the wavelength of the desired operating frequency. A portion of the incident radiation on the second structure will then be reflected back toward the active grid but out of phase by half of the wavelength or 180°. Accordingly, the two reflected beams destructively interfere. It should be noted that the admittance of the second structure should be the same as that of the active grid to ensure complete destructive interference. Further, the conductive traces 25 of the second structure should be parallel to the electric field vector of the incident radiation.

According to the present invention, the second structure is provided by passive grid 14 having the desired admittance. Referring to FIG. 4, passive grid 14 comprises traces 25 which interconnect conductive elements 24 and which are parallel to the electric field vector of the incident radiation. It is important to note that the admittance of the passive and active grids are determined by the inductance per unit area for each respective structure. Accordingly, for the two admittances to be identical, passive grid 14 is characterized by an inductance per unit area which is substantially equal to the inductance of the forward biased diodes of active grid 12. The inductance per unit area of passive grid 14 is dependent on the dimensions of conductive elements 24 as well as the spacing therebetween, which is discussed in more detail in Section V.

The passive grid has an identical pattern of conductive elements as that of the active grid. However, in the vertical direction conductive elements are interconnected by conductors whose inductance approximates that of a turned-on diode. The rear surface of passive grid 14 is separated from the front surface of active grid 12 by dielectric spacer 16. Reflections from passive grid 14 (180° out of phase) substantially cancel the reflections from active grid 12, thereby minimizing the reflection of the incident wave on switch 10.

The thickness of spacer 16, that is, the distance between the front surface of active grid 12 and the rear surface of passive grid 14 is selected to be one-quarter of the wavelength at which maximum radiation is to be transmitted. Normally, this is the wavelength at which the maximum refection occurs in the OFF state. Variations in the inductance component of the forward-biased diodes of active grid 12 may cause the maximum transmission at the desired frequency to vary between switches.

A quasi-optical transmission/reflection switch comprising 464 PIN diodes was constructed according to the present invention. A 0.9 inch diameter circular window (22 in FIG. 2) was etched in the surface of a square 1 inch substrate (20 in FIG. 2) having a thickness dimension of 0.01 inches. Conductive elements 24 were electrically connected by traces 26 in the horizontal direction and by PIN diodes 28 in the vertical direction. The physical dimensions of conductive elements 24, traces 26, PIN diodes 28, and the diode leads of the switch as constructed, are shown in FIG. 3 wherein all dimensions are in mils. The physical dimensions of the pattern of conductive elements for the passive grid is the same as that of active grid. Traces in the passive grid approximate the inductance of a turned-on diode interconnecting vertically adjacent conductive elements of active grid 12.

Figure 5:
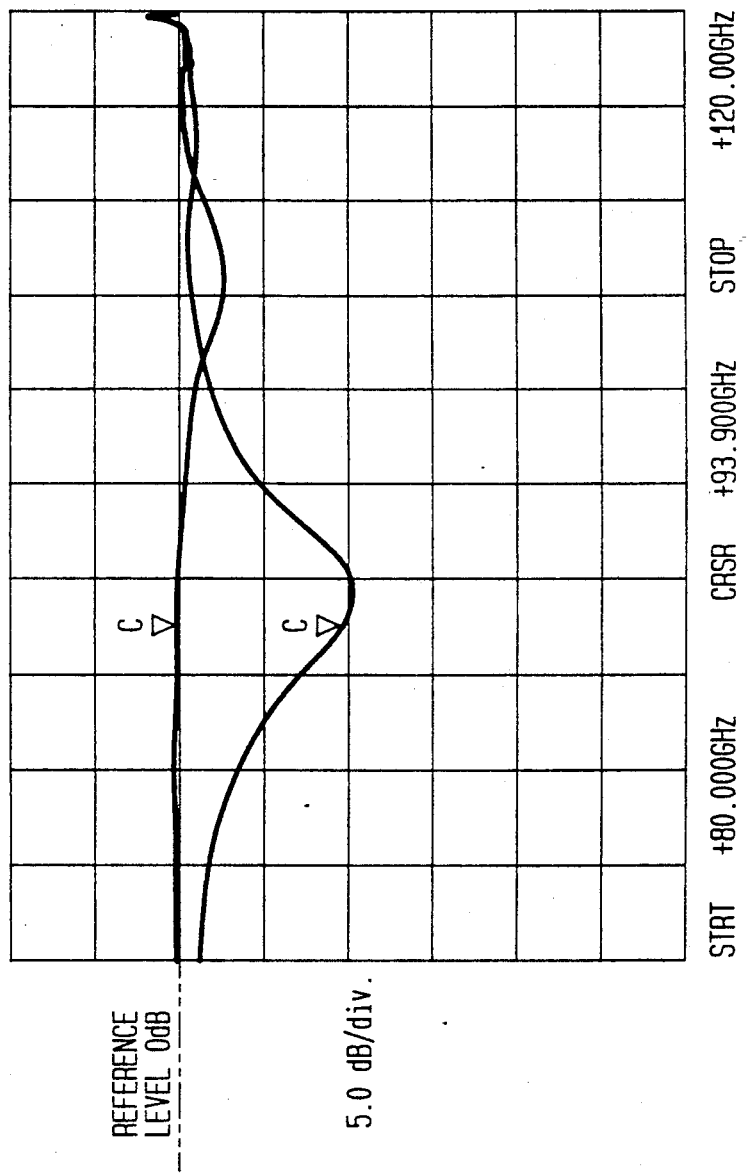
FIG. 5 is a plot of the reflection loss of the quasi-optical transmission/reflection switch over the frequency range of 80–120 GHZ.

Quasi-optical transmission and reflection tests were conducted on the switch over the frequency range of 80–120 GHZ. FIG. 5 is a plot of the reflection loss of the switch of the present invention, as constructed, for a vertically polarized quasi-optical beam incident at 17° to normal to the front surface of the switch. During the reflection loss test, a reference level of the reflected signal was established by reflecting the incident beam with a gold-plated reflector. The gold-plated reflector was then replaced by the quasi-optical transmission/reflection switch constructed as discussed previously. To determine the reflection loss, the power level of the returned beam reflected by the switch was compared to the reference level (i.e., the power level of the beam reflected by the gold-plated reflector). As illustrated by the plot of FIG. 5, at a frequency of approximately 93.9 GHZ, the reflection loss of the switch in the OFF state (reflection mode) is less than 1 dB, and in the ON state (transmission mode) is greater than 9 dB. The accuracy of the reflection loss measurement was approximately plus or minus 0.4 dB due to the inability to position the switch in precisely the same location as the gold-plated reflector after establishing a reference level.

Figure 6:
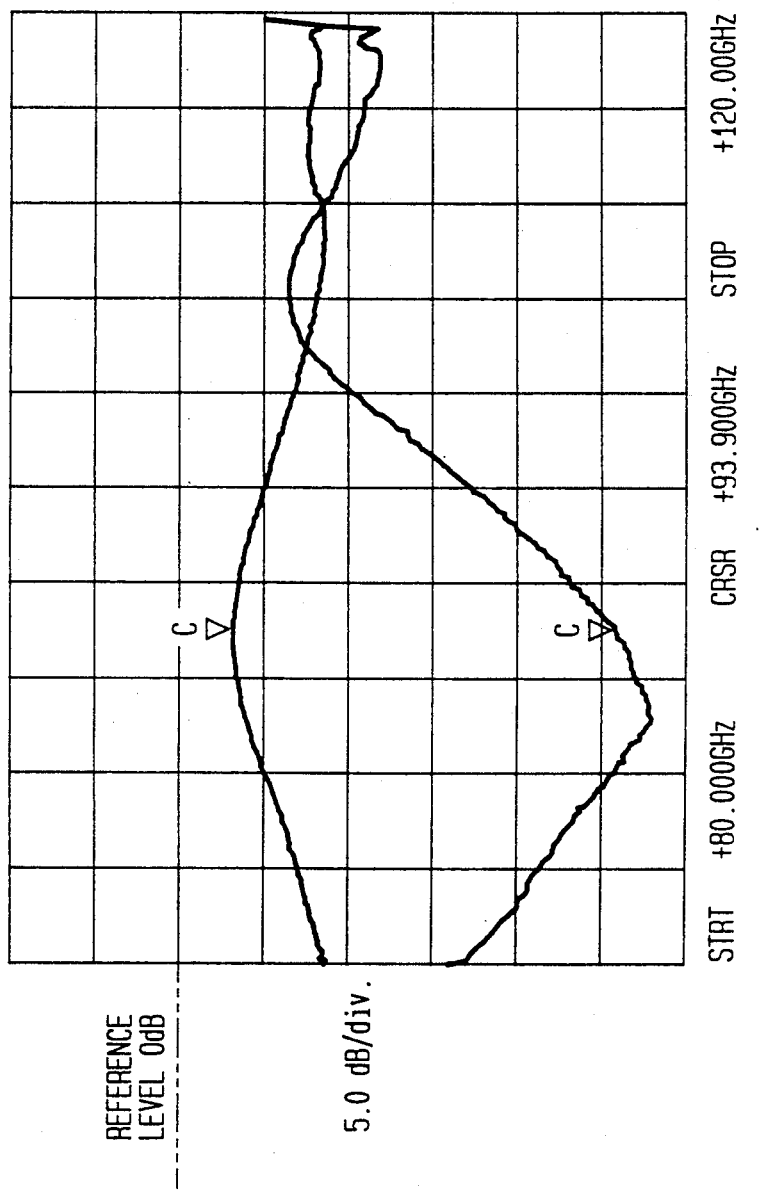
FIG. 6 is a plot of the transmission loss of the quasi-optical transmission/reflection switch over the frequency range of 80–120 GHZ.

FIG. 6 is a plot of the transmission loss of the same switch for vertically polarized quasi-optical beam incident upon the switch at a 17° angle of incidence. As illustrated, in the OFF state (reflection mode), the switch exhibits a transmission loss which is greater than 25 dB at a frequency of the incident radiation of approximately 93.9 GHZ. In the ON state, the switch exhibits a transmission loss of less than 4 dB at a frequency of incident radiation of 93.9 GHZ, which is the frequency of maximum transmission.

If a horizontally polarized quasi-optical beam is incident on the aforementioned switch, virtually no current will be induced in the vertical diodes. Thus, a horizontally polarized wave is not affected by the bias state of the diodes. Furthermore, the horizontally polarized beam will neither be substantially transmitted nor reflected (i.e., a portion of the energy will be reflected and a portion of the energy will be transmitted) due to the impedance mismatch caused by the traces of the active grid. With passive grid 14 re-oriented such that the traces are horizontal (i.e., parallel to the traces in the active grid), a horizontally polarized wave may be transmitted by the switch in a manner similar to the transmission of the vertically polarized beam. Horizontally polarized radiation will be transmitted through the active and passive grids, with a portion of radiation reflected from each grid. With the grid separated by a quarter of the desired wavelength, the reflected beams will be out of phase by 180° and destructively interfere.

Figure 7:
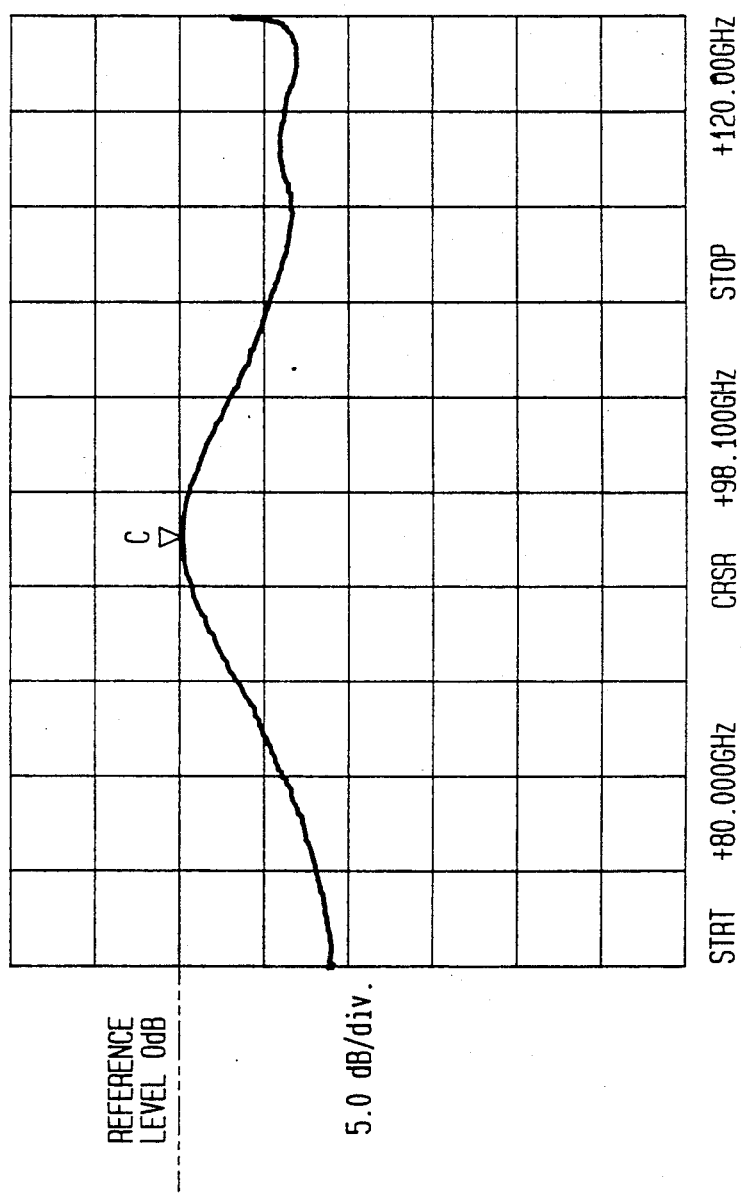
FIG. 7 is a plot of the transmission loss of the quasi-optical transmission/reflection switch for a horizontally polarized electromagnetic wave.

FIG. 7 is a plot of the transmission loss of a switch in which the passive grid has been rotated by 90° for a horizontally polarized beam. As mentioned above, the horizontally polarized beam is unaffected by the bias state of the diodes and therefore the current switch configuration does not provide means for reflecting the horizontally polarized beam. Accordingly, FIG. 7 only depicts a transmission mode plot. As is apparent, the frequency of minimum transmission loss is 98.1 GHZ, which differs from the minimum transmission loss of the switch as originally configured for a vertically polarized beam. By replacing the passive grid with one having a conductive pattern of different physical dimensions, the difference in the frequencies of minimum loss can be minimized.

Section III

The following procedure illustrates one method of designing the active grid of the present invention such that the inductance component resonates with the reverse-biased diode capacitance at a preselected operating frequency.

First, assuming the conductive pattern of the active grid is a square array, the inductance L per unit area required for resonating with the diode capacitance a desired operating frequency is:

$$L = \frac{1}{(2\pi f)^2 C} \tag{1}$$

where
 C = reverse-biased diode capacitance
 f = frequency of operation.

Figure 8:
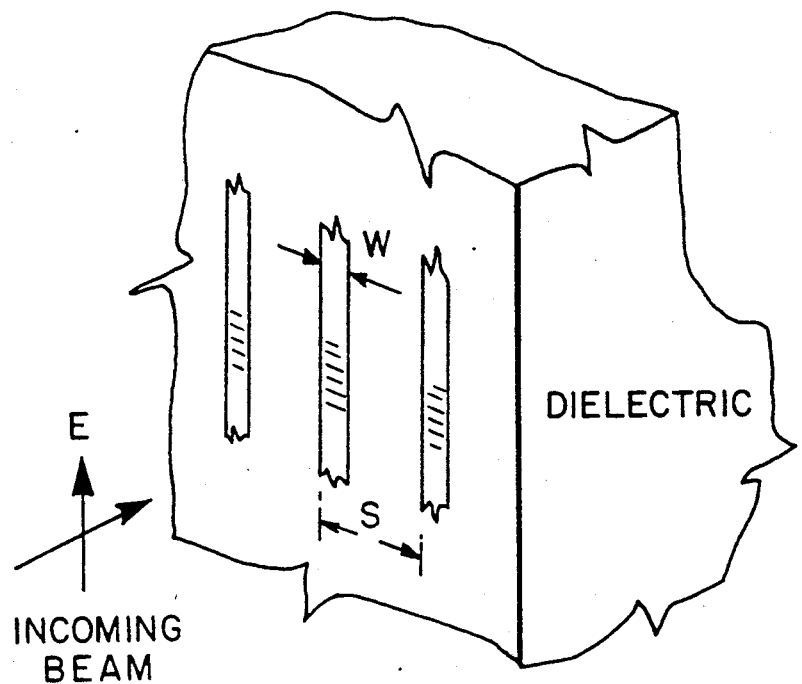
FIG. 8 is an illustration of a dielectric substrate comprising uniform strips of conductive material.

If the grid consists of uniform strips of width W located at a periodic pitch S, as shown in FIG. 8, the inductance $L_L$ per unit area is:

$$L_L = \frac{\mu_o S}{2\pi} \ln \frac{1}{\sin\left(\frac{\pi W}{2S}\right)} \tag{2}$$

where
 $\mu_o$ = permeability of vacuum ($3.192 \times 10^{-8}$ henrys/in)
 S = grid period (inches)

W = width of grid strip (inches)

The inductance per unit area computed by equation (2) does not include the effect of DC connections (i.e., traces) between the uniform strip. However, it will be used as a reference inductance in the empirical process described below.

Figure 9:
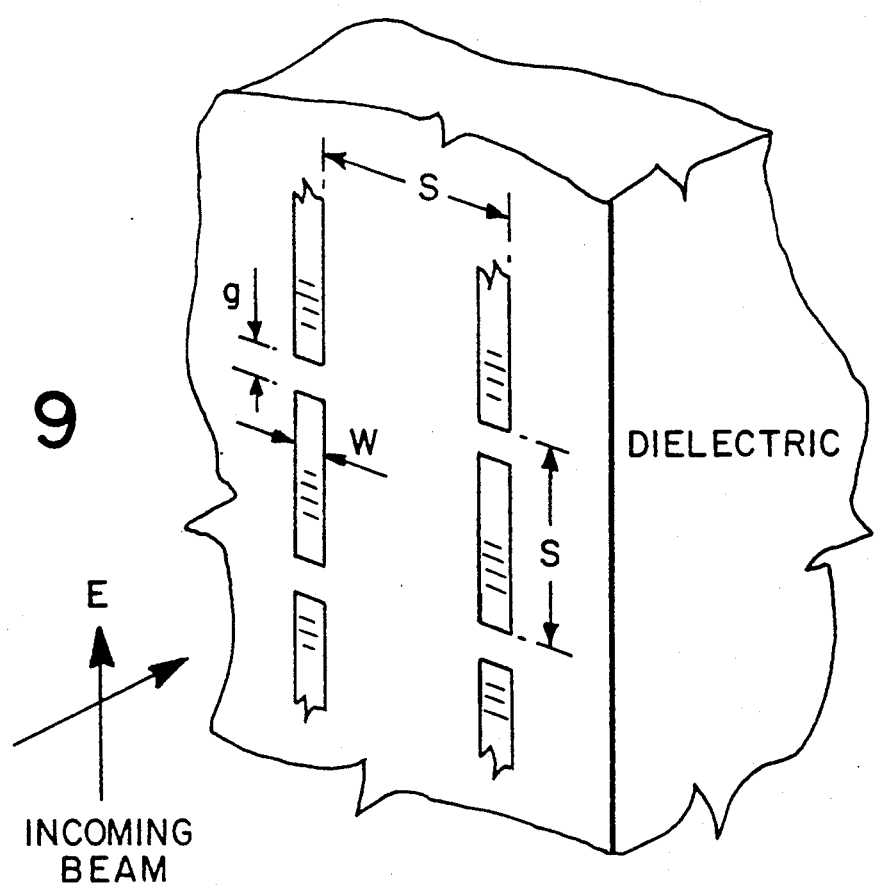
FIG. 9 is an illustration of a dielectric substrate comprising sectional strips of conductive material.

First, the inductance per unit area required to resonate with the reverse-biased diode capacitance is calculated according to equation (1). Second, in accordance with equation (2), a strip spacing S and a strip width W are selected such that the inductance $L_L$ calculated by equation (2) is greater than the inductance L computed in equation (1). The gap width g is selected to accommodate the mounting of the diodes vertically between adjacent strips. Next, the switch exhibiting the selected strip dimensions and gap width as shown in FIG. 9 is fabricated. A reflection loss test is conducted, as described in Section II, to determine the frequency of minimum reflection loss $f_L$, which is the frequency at which the inductance resonates with the gap capacitance $C_g$.

The gap capacitance, which corresponds to a selected strip spacing and width, is now calculated from the inductance value $L_L$ and the resonant frequency $f_L$:

$$C_g = \frac{1}{(2\pi f_L)^2 L_L} \quad (3)$$

Next, the gap capacitance $C_g$, is used to determine the final desired inductance of the circuit, which as previously described varies with the physical dimensions of the conductive elements.

Upon designing the pattern and shape of the conductive elements, the elements are arranged in accordance with spacing and width of gap g used to calculate $C_g$, as illustrated by FIG. 9, so as to form an experimental grid. The resonant frequency of this experimental grid is then determined, as previously described, and defined as $f_e$. Therefore, the inductance $L_e$ of the experimental grid equals:

$$L_e = \frac{1}{(2\pi f_e)^2 C_g} \quad (4)$$

The inductance of the experimental grid $L_e$ must equal the final desired inductance L, which was computed in accordance with equation (1). If $L_e$ does not equal L, a grid design (i.e., pattern and shape of conductive elements) exhibiting the desired inductance must be designed.

Figure 10:
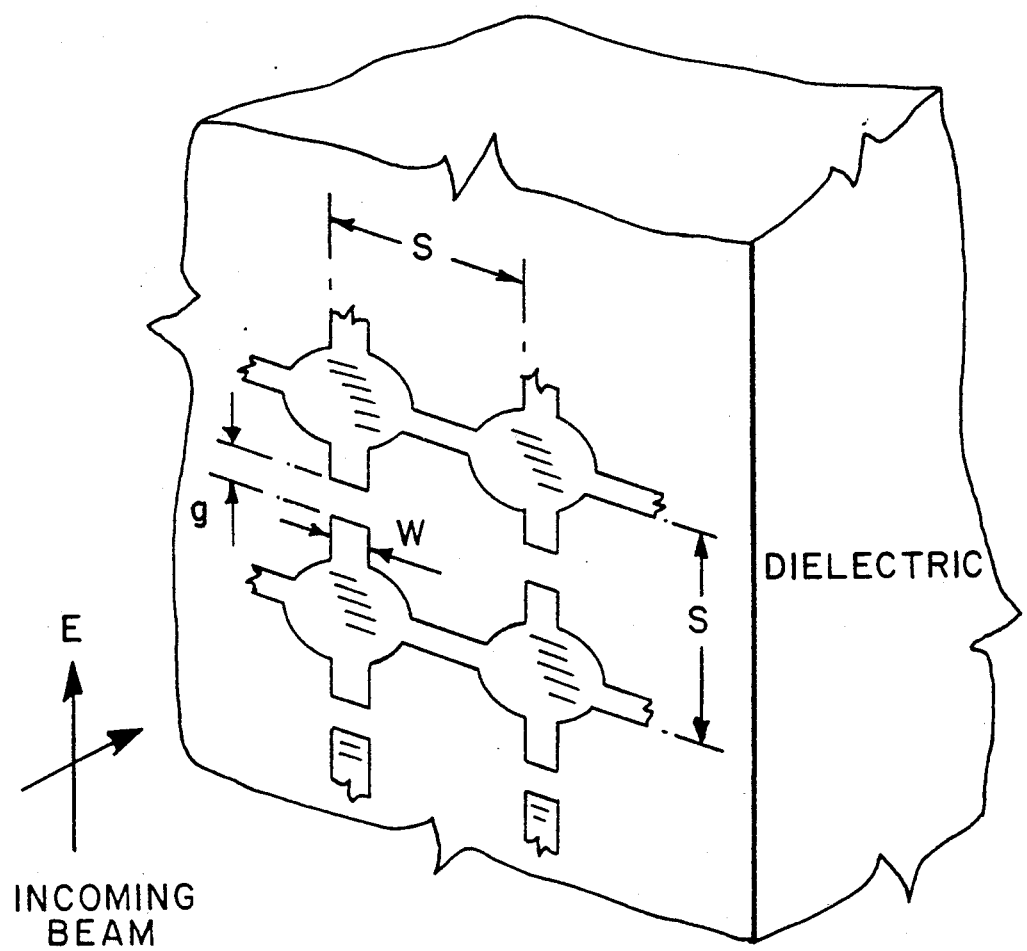
FIG. 10 is an illustration of a dielectric substrate comprising conductive elements exhibiting a circular shape.

It is desirable to obtain as low an inductance as possible. Advantageously, it was determined that a grid design as shown in FIG. 10 comprising circular conductive elements interconnected by strips is close to optimum to provide the lowest inductance possible for a given mesh period.

Section IV

Figure 11A:
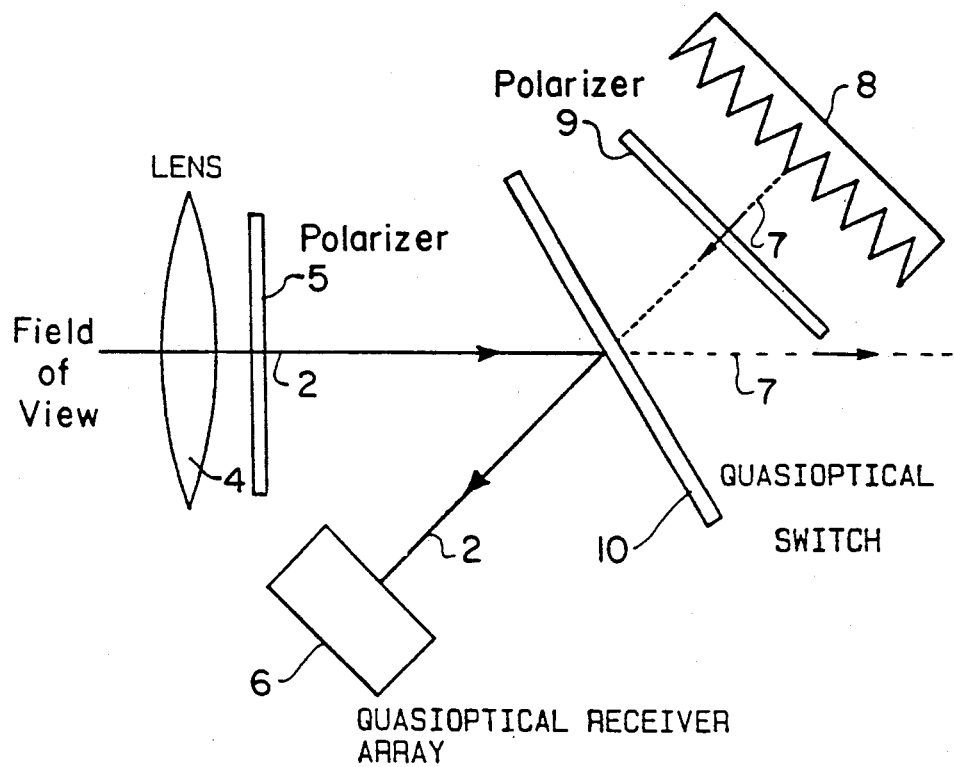
FIGS. 11A and 11B are diagrammatic illustrations of a quasi-optical transmission/reflection switch of the present invention incorporated into a millimeter-wave imaging system.
Figure 11B:
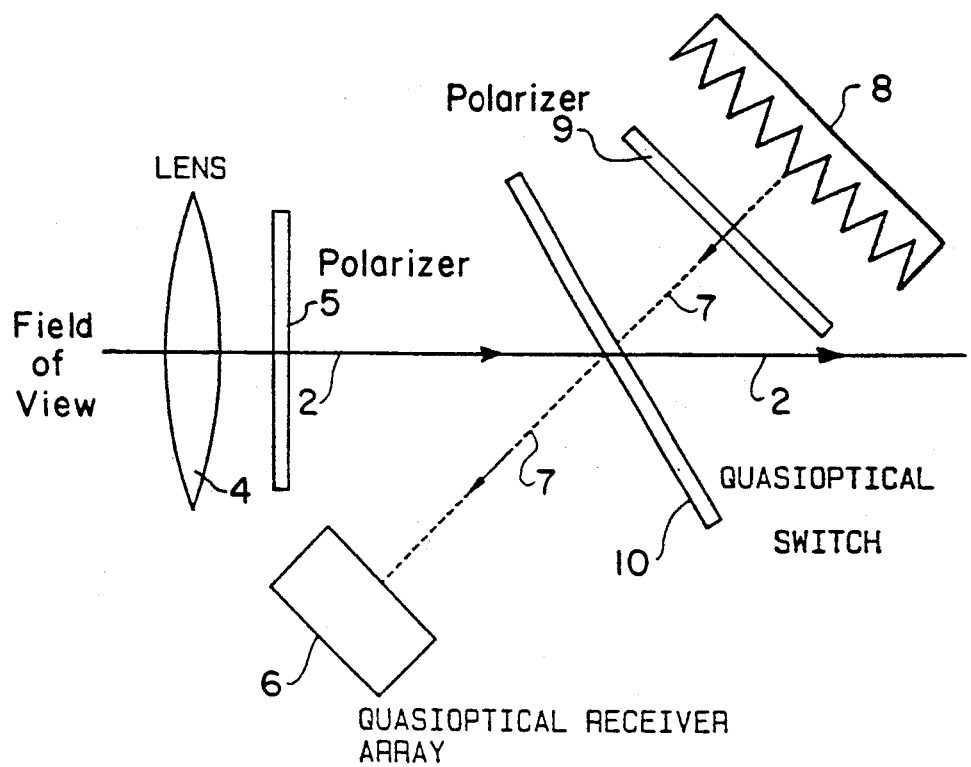

FIGS. 11A and 11B provide an example of an application of quasi-optical transmission/reflection switch 10 of the present invention in a millimeter-wave imaging system such as the system disclosed in U.S. patent application Ser. No. 07/459,879 issued on Sep. 10, 1991 as U.S. Pat. No. 5,047,783. To eliminate gain variations in the system, this imaging system requires that the radiation incident on the receiver array alternates between radiation emanating from a field of view and the radiation emanating from a uniform load that provides a comparison load signal. The quasi-optical transmission/reflection switch of the present invention provides this capability by electronically switching the energy incident on the receiver array between the two different illuminating sources.

In FIG. 11A, switch 10 is in OFF state (i.e., reflection mode). Prior to contacting switch 10, electromagnetic beam 2 emanating from a field of view is incident on lens 4 and directed through polarizer 5 which produces a linearly polarized electromagnetic beam having an electric field vector parallel to the direction of the diodes of switch 10 when the switch is in the OFF state. Since resulting electromagnetic beam 2 incident on switch 10 is linearly polarized and has an electric field vector parallel to the direction of the diodes, it is virtually totally reflected by switch 10 when the switch is in the OFF state. The angle of incidence of the field-of-view radiation with respect to the switch is selected such that the reflected energy radiates in the direction of receiver array 6.

Electromagnetic beam 7 emanating from uniform load 8 is linearly polarized by polarizer 9 so that its electric field vector is parallel to the direction of the diodes of switch 10. Beam 7 is also reflected by switch 10 and, therefore, does not reach receiver array 6. More specifically, since the interconnected conductive elements of the passive grid are oriented parallel to the polarization of beam 7, beam 7 is partially reflected by the passive grid with the transmitted portion reflected by the active grid of switch 10. Thus, when the switch is OFF, receiver array 6 detects radiation from only the field of view.

In the ON state (i.e., the transmission mode), as shown in FIG. 11B, electromagnetic beam 2 emanating from the field of view, which is polarized by polarizer 5, is transmitted through switch 10 and therefore, beam 2 never reaches receiver array 6. However, electromagnetic beam 7 emanating from uniform load 8 is also transmitted through switch 10, and is detected by receiver array 6. Therefore, in the ON state receiver array 6 is illuminated by radiation from uniform load 8.

Section V

Figure 12A:
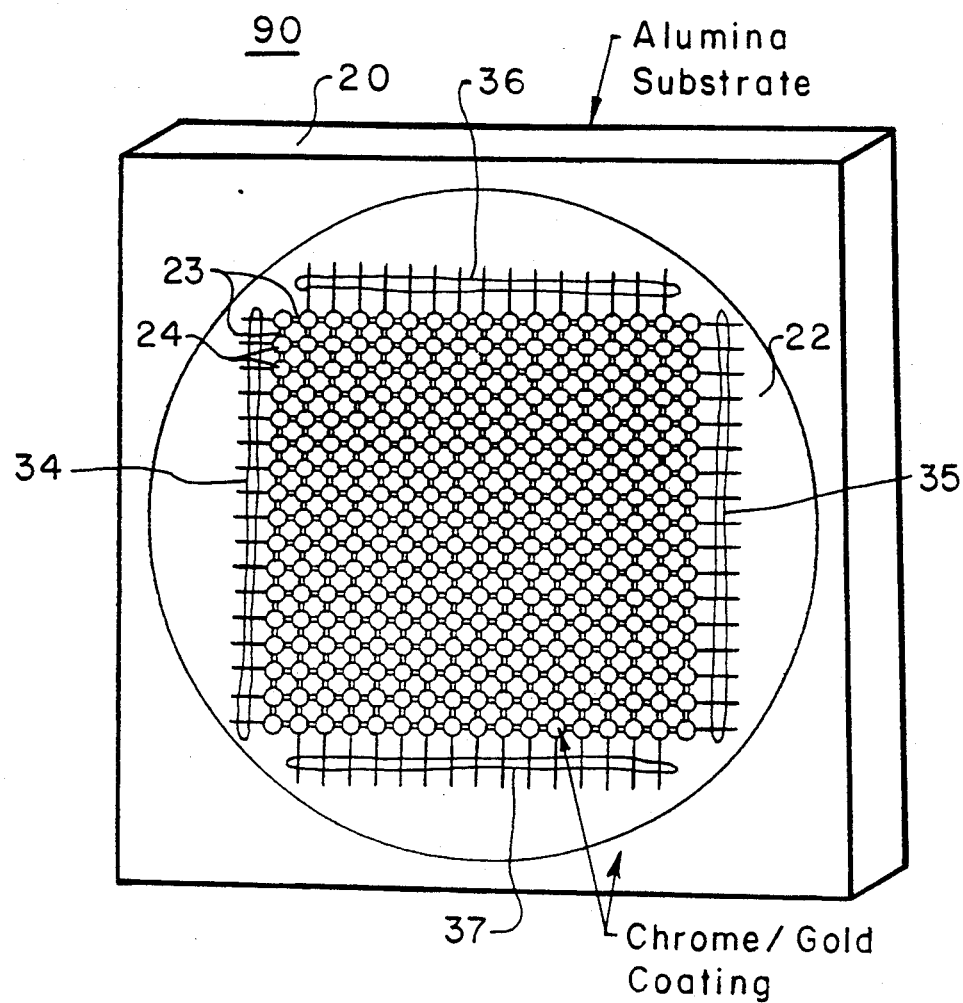
FIG. 12A is another exemplary embodiment of the inventive quasi-optical transmission/reflection switch of the present invention.
Figure 12B:
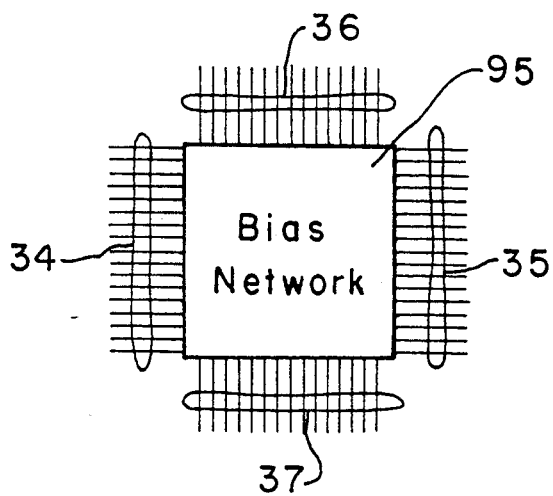
FIG. 12B is a diagrammatic illustration of a bias network for the quasi-optical switch of FIG. 12A.

Referring to FIGS. 12A and 12B, in another embodiment of the invention, a square array of conductive elements 24 is formed in window 22 similar to the structure shown in FIG. 2, but the traces in the active grid are replaced by diodes so that diodes 23 interconnect conductive elements 24 in both the first and second directions of the grid pattern. Utilizing bias leads 34, 35, 36 and 37 attached to edge conductive elements, bias network 95 provides means for forward biasing the diodes in the first direction and reverse biasing the diodes in the second direction or vice versa. Furthermore, the passive grid of such a device comprises traces in both the first and second direction so as to cancel unwanted reflections regardless of the polarization of the incident wave. The thickness of the spacer is one-quarter the wavelength of the incident wave.

In this embodiment of the invention, device 90 functions as an electronically controlled polarization selector capable of electronically selecting the polarization of the beam that is transmitted through the device. For example, assuming the device comprises a square grid pattern and the horizontal rows of diodes are forward-biased and the vertical columns of diodes are reverse-biased, the device transmits horizontally polarized energy and reflects vertically polarized energy. However, if the rows of diodes are reverse-biased and the columns of diodes are forward-biased, the device transmits vertically polarized energy and reflects horizontally polarized radiation. Thus, the device provides means for electronically selecting the polarization of the transmitted beam (or the reflected beam) between orthogonal polarizations.

Polarization selector 90 may be utilized in combination with polarizing grids as an electronic polarization switch capable of either transmitting radiation polarized in one direction, or transmitting and transforming radiation polarized in one direction into radiation polarized in an orthogonal direction.

Figure 13:
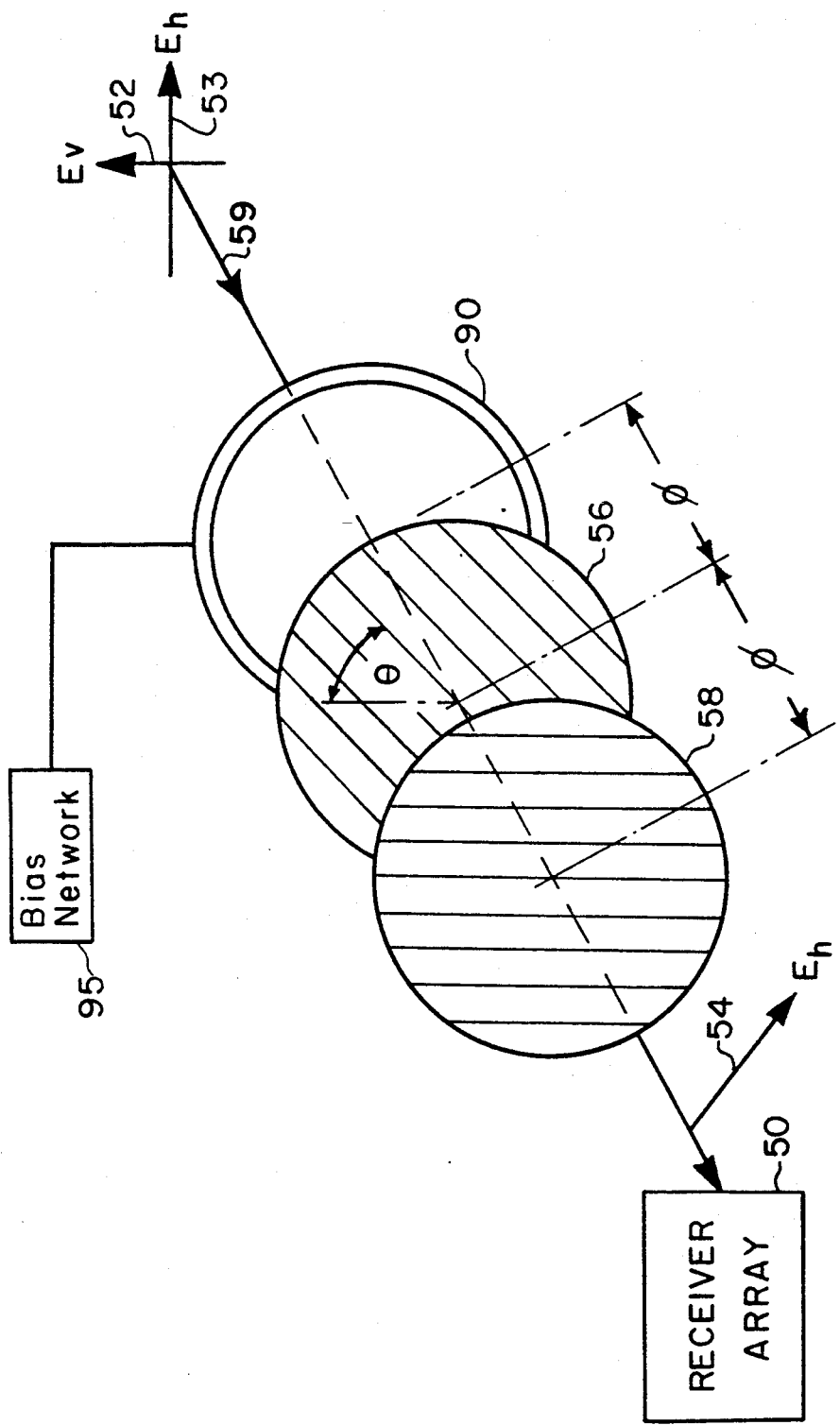
FIG. 13 is a diagrammatic illustration of a quasi-optical polarizer of the present invention incorporated into a polarization rotation system.

FIG. 13 illustrates the application of this feature to a system which rotates the polarization of radiation that emanate from sources of different polarizations so that either source can be detected by a receiver that is sensitive to one direction of polarization. The apparatus comprises a polarization selector 90 and two polarizing grids 56, 58, each of which is made of an array of parallel conductive wires. Each grid acts as a perfect conductor for radiation polarized parallel to the direction of the wires. Accordingly, each grid reflects radiation polarized parallel to the direction of the wires and transmits radiation polarized orthogonal to the direction of the wires. The wires of grid 58 are aligned in the vertical direction, thereby having a transmission axis in the horizontal direction. The wires of grid 56, however, are at an angle $\theta$ relative to the vertical direction, thereby having a transmission axis at an angle $\theta$ relative to the horizontal axis.

In FIG. 13, beams 52, 53 of electromagnetic radiation are incident on polarization selector 90. As indicated by the electric vectors $E_v$ and $E_h$, beams 52 and 53 are vertically and horizontally polarized, respectively. In a first state, polarization selector 90 reflects beam 53 and transmits beam 52. This is accomplished by bias network 95 forward-biasing diodes in the vertical direction while reverse-biasing diodes in the horizontal direction. In a second state, polarization selector 90 transmits beam 53 and reflects beam 52. This is accomplished by bias network 95 reverse-biasing diodes in the vertical direction while forward-biasing diodes in the horizontal direction.

Horizontally polarized beam 53 traverses the quasi-optical bandpass filter comprising polarization selector 90, polarizer 56, and polarizer 58. The wires of polarizer 56 are offset from the vertical axis by $\theta$ degrees. The spacing from polarization selector 90 to polarizer 56, and from polarizer 56 to polarizer 58 is the same, and is expressed in terms of the phase delay $$\phi = \frac{2\pi}{\lambda} d,$$

where $\lambda$ is the wavelength of incident radiation 52, 53, and d is the distance between polarizers 58 and 56, or between polarizer 56 and polarization selector 90.

The transmission power ratio T of the wave transmitted through the quasi-optical bandpass filter the wave incident on the filter is given by $$T = \frac{1}{1 + (\tan^4\theta)(\cot^2\phi)}$$

It is clear that for the special cases $$\phi = (2n - 1)\frac{\pi}{2}$$

where n = 1, 2, 3, ..., that is, for a spacing d that is an odd multiple of one quarter or a wavelength, ($\cot^2\phi = 0$ and T = 1) all the incident power is transmitted with no loss (assuming ideal polarizers). For a more general discussion on quasi-optical bandpass filter, see A. A. M. Saleh, *Microwave Theory and Techniques*, pp. 728-739, July 1974.

It can be shown that the identical transmission characteristic may be exhibited for the two states of polarization selector 90. In the first state, polarization selector 90 transmits beam 53 and reflects beam 52. The difference between the polarization angles of polarization selector 90 and polarizer 56 is $\theta$, whereas the difference between the polarization angles of polarizer 56 and polarizer 58 is $-\theta$. It should be noted that the polarization angle is the angle at which the polarizing element blocks the incident radiation. As long as the wavelength of the incident radiation causes the phase delay $\phi$ to be an odd multiple of a quarter wavelength, horizontally polarized beam 53 is transmitted, without loss or change of polarization direction, to receiver array 50.

For the second state of polarization selector 90, vertically polarized beam 52 is transmitted and horizontally polarized beam 53 is reflected. The difference between the polarization angles of polarization selector 90 and polarizer 56 is 90 $- \theta$ and the difference between the polarization angles of polarizer 56 and polarizer 58 is $\theta$. For the special case $\theta = 45°$, the difference in polarization angles between adjacent polarizing elements is the same, that is from polarizer selector 90 to polarizer 56 and from polarizer 56 to polarizer 58. As such, all the power in incident beam 52 will be transmitted through the quasi-optical filter identical to when polarization selector 90 is in the first state. However, in the second state, multiple internal reflections inside the filter succeed in effectively rotating the polarization of the incoming beam by 90°, allowing receiver array 50 to view selectively either horizontally or vertically polarized radiation according to the state of polarization selector 90.

The present invention has been presented in terms of various examples. However, various other modifications may be made by those skilled in the art which embody the principles of the invention and fall within the spirit and the scope thereof. For example, the present invention is not limited to the hybrid diode array (i.e., one where the diodes are discrete, and bonded onto the dielectric substrate). The device of the present invention can be fabricated in a monolithic integrated circuit, wherein the diodes and conductive elements are formed upon a common substrate of an appropriate semiconductor material, such as silicon or gallium arsenide. The fabrication and the engineering methods set forth above with regard to the hybrid design are applicable to the design of a monolithic quasi-optical transmission/reflection switch.

Further, the scope of the claims contemplates a broad range of applications. It will be clear to those skilled in the art that the examples set forth are merely illustrative of the almost endless applications of the present invention, some of which will become apparent in the future, and that the invention is intended to be limited only in accordance with the claims.

I claim:

1. A quasi-optical switch comprising:
a first substrate;
a pattern of first conductive elements disposed on a first surface of the first substrate; and
means for connecting adjacent first conductive elements in a first direction, said connecting means having a first impedance in a first state when not conducting and a second impedance in a second state when conducting, the conductive elements having an impedance which in response to incident radiation that is polarized in said first direction substantially cancels said first impedance such that the incident radiation is substantially reflected, and which impedance of the conductive elements in combination with said second impedance yields a non-zero, finite value such that the incident radiation is substantially transmitted.

2. The quasi-optical switch of claim 1 further comprising first conductive means for connecting adjacent first conductive elements in a second direction.

3. The quasi-optical switch of claim 1 wherein the means for connecting adjacent first conductive elements in the first direction are diodes.

4. The quasi-optical switch of claim 3 further comprising means for biasing the diodes so as to switch the quasi-optical switch between the first and second states.

5. The quasi-optical switch of claim 4 wherein the diodes are zero biased or reversed biased by the biasing means when the switch is in the first state.

6. The quasi-optical switch of claim 4 wherein the diodes are forward biased by the biasing means when the switch is in the second state.

7. The quasi-optical switch of claim 3 wherein when the switch is in the first state the diodes have an equivalent circuit of a capacitance in series with a resistance.

8. The quasi-optical switch of claim 7 wherein when the switch is in the first state radiation polarized in the first direction causes the inductance of the conductive elements to resonate with the capacitance of the diodes such that the combined first impedance is substantially zero.

9. The quasi-optical switch of claim 3 wherein when the switch is in the second state the diodes have an equivalent circuit of an inductance in series with a resistance.

10. The quasi-optical switch of claim 1 further comprising a second substrate;
a pattern of second conductive elements disposed on a first surface of the second substrate; and
second conductive means for connecting adjacent second conductive elements in the first direction.

11. The quasi-optical switch in claim 10 wherein the second conductive elements are spaced from the first conductive elements a quarter of the wavelength of the incident radiation such that radiation reflected from the pattern of first conductive elements when the switch is in the second state is substantially canceled by radiation reflected from the pattern of second conductive elements.

12. The quasi-optical switch in claim 11 wherein a second admittance of the second conductive elements is substantially the same as a first admittance of the diodes when the switch is in the second state.

13. The quasi-optical switch of claim 1 further comprising a second substrate;
a pattern of second conductive elements disposed on a first surface of the second substrate; and
second conductive means for connecting adjacent conductive elements of the second conductive elements in a second direction.

14. The quasi-optical switch of claim 1 further comprising:
a second substrate;
a pattern of second conductive elements disposed on a first surface of the second substrate; and
second conductive means for connecting adjacent conductive elements of the second conductive elements in the first direction.

15. A quasi-optical switch comprising:
a first pattern of first conductive elements; and
diodes interconnecting adjacent first conductive elements in a first direction, the diodes having a first admittance when forward biased, and the diodes having an intrinsic impedance when reversed biased or zero biased, the conductive elements having an inductance for radiation polarized in the first direction incident on the diodes that substantially cancels the intrinsic impedance of the diodes so that the incident radiation is substantially reflected.

16. A switching means for selectively transmitting or reflecting incident radiation, the switching means comprising:
a first pattern of conductive elements extending in first and second directions in a substantially planar array, wherein adjacent conductive elements in the first direction of the first pattern are connected by diodes and adjacent conductive elements in the second direction of the first pattern are connected by conductors, the diodes being selectively operable in a first state in which they are not conducting and in a second state in which they are conducting, wherein the physical dimensions of the first pattern of conductive elements are such that, in response to linear polarized incident radiation of a pre-selected frequency having an electric field vector parallel to the first direction of the first pattern of conductive elements, the switching means causes substantial reflection of incident radiation when the diodes are in the first state and substantial transmission of incident radiation when the diodes are in the second state.

17. The apparatus of claim 16 wherein the first and second directions are perpendicular.

18. The apparatus of claim 16 wherein the bias state of the diodes is controlled by applying a voltage potential across the diodes.

19. The apparatus of claim 16 wherein the diodes are connected to adjacent conductive elements such that the positive and negative terminals of each diode are aligned in the same direction.

20. The apparatus of claim 16 wherein the diodes connecting the conductive elements in the first direction are PIN diodes.

21. The apparatus of claim 16 wherein the first pattern of conductive elements is fabricated monolithically on a substrate.

22. A switching means for selectively transmitting or reflecting incident radiation, the switching means comprising:
a first pattern of conductive elements extending in first and second directions in a substantially planar array, wherein adjacent conductive elements in the first direction of the first pattern are connected by diodes and adjacent conductive elements in the second direction of the first pattern are connected by diodes, the diodes being selectively operable in a first state in which they are not conducting and in a second state in which they are conducting, wherein the physical dimensions of the first pattern of conductive elements are such that, in response to linear polarized incident radiation of a pre-selected frequency having an electric field vector parallel to either the first or second direction of the first pattern of conductive elements, the switching means causes substantial reflection of incident radiation when the diodes parallel to the electric field vector of the incident radiation are in the first state and causes substantial transmission of incident radiation when the diodes are in the second state.

23. The apparatus of claim 22 wherein the first and second directions are perpendicular.

24. The apparatus of claim 28 wherein the diodes are connected to adjacent conductive elements in the first direction such that the positive and negative terminals of each diode are aligned in the same direction.

25. The apparatus of claim 22 wherein the diodes are connected to adjacent conductive elements in the second direction such that the positive and negative terminals of each diode are aligned in the same direction.

26. The apparatus of claim 22 further comprising means for independently controlling the bias state of the diodes in the first and second directions.

27. The apparatus of claim 22 wherein the diodes connecting conductive elements in the first and second directions are PIN diodes.

28. The apparatus of claim 27 further comprising a first and second bias network, the first bias network providing means for either forward-biasing or reverse-biasing all of the diodes in the first direction, the second bias network providing means for either forward-biasing or reverse-biasing all of the diodes in the second direction.

29. The apparatus of claim 27 wherein the bias state of the diodes is controlled by applying a voltage potential across the diodes.

30. The apparatus of claim 22 wherein the first pattern of conductive elements is fabricated monolithically on a substrate.

31. A quasi-optical bandpass filter comprising:
a first polarizer having a transmission axis parallel to a first direction;
a second polarizer having a transmission axis offset an angle θ from a second direction, the second polarizer disposed in front of the first polarizer; and
switching means for selectively transmitting radiation that is linearly polarized in the first direction and reflecting radiation that is linearly polarized in the second direction, and transmitting radiation that is linearly polarized in the second direction and reflecting radiation that is linearly polarized in the first direction, the switching means including
a first pattern of first conductive elements extending in first and second directions in a substantially planar array, wherein adjacent first conductive elements in the first direction are connected by first diodes and adjacent first conductive elements in the second direction are connected by second diodes, the first and second diodes being selectively operable in a first state in which they are not conducting and in a second state in which they are conducting,
wherein the physical dimensions of the first pattern of first conductive elements are such that the switching means causes substantial transmission of a first incident radiation linearly polarized in the first direction and reflection of a second incident radiation polarized in the second direction when the first diodes are in the second state and the second diodes are in the first state, and causes substantial transmission of the second incident radiation and reflection of the first incident radiation when the first diodes are in the first state and the second diodes are in the second state.

32. The quasi-optical imaging system as defined in claim 31 further comprising:
first means for biasing the first diodes between the first and second states; and
second means for biasing the second diodes between the first and second states.

33. A millimeter-wave imaging system comprising:
a receiver array;
a means for focusing millimeter wave radiation from a field of view onto the receiver array;
a uniform load for providing a noise calibration signal to the receiver array; and
switching means for alternately directing the signal from the field of view and from the uniform load onto the receiver array, the switching means comprising,
a first substrate,
a pattern of first conductive elements disposed on a first surface of the first substrate, and
means for connecting adjacent first conductive elements in a first direction, said connecting means having a first impedance in a first state when not conducting and a second impedance in a second state when conducting, the conductive elements having an impedance which in response to incident radiation that is polarized in said first direction substantially cancels said first impedance such that the incident radiation is substantially reflected, and which impedance of the conductive elements in combination with said second impedance yields a non-zero, finite value such that the incident radiation is substantially transmitted.

34. A switching means for selectively transmitting or reflecting incident radiation, the switching means comprising:
a first pattern of conductive elements extending in first and second directions in a substantially planar array, wherein adjacent conductive elements in the first direction of the first pattern are connected by diodes and adjacent conductive elements in the second direction of the first pattern are connected by conductors, the diodes being selectively operable in a first state in which they are not conducting and in a second state in which they are conducting, wherein the physical dimensions of the first pattern of conductive elements are such that, in response to linear polarized incident radiation of a preselected frequency having an electric field vector parallel to the first direction of the first pattern of conductive elements, the switching means causes substantial reflection of incident radiation when the diodes are in the first state and substantial transmission of incident radiation when the diodes are in the second state, and
a second pattern of conductive elements extending in the first and second directions in a substantially planar array spaced apart from the first pattern, wherein adjacent conductive elements in the first direction of the second pattern are connected by conductors.

35. The switching means of claim 34 wherein the distance between the first pattern and the second pattern is approximately one-quarter of the wavelength of the incident radiation.

36. The apparatus of claim 34 wherein the conductive elements of the first and second patterns have a circular shape.

37. The apparatus of claim 34 wherein the second pattern of conductive elements is substantially identical to the first pattern of conductive elements.

38. A switching means for selectively transmitting or reflecting incident radiation, the switching means comprising:

a first pattern of conductive elements extending in first and second directions in a substantially planar array, wherein adjacent conductive elements in the first direction of the first pattern are connected by diodes and adjacent conductive elements in the second direction of the first pattern are connected by diodes, the diodes being selectively operable in a first state in which they are not conducting and in a second state in which they are conducting, wherein the physical dimensions of the first pattern of conductive elements are such that, in response to linear polarized incident radiation of a pre-selected frequency having an electric field vector parallel to either the first or second direction of the first pattern of conductive elements, the switching means causes substantial reflection of incident radiation when the diodes parallel to the electric field vector of the incident radiation are in the first state and causes substantial transmission of incident radiation when the diodes are in the second state, and a second pattern of conductive elements extending in the first and second directions in a substantially planar array spaced apart from the first pattern, wherein adjacent conductive elements in the first and second directions are connected by conductors.

39. The apparatus of claim 38 wherein the distance between the first pattern and the second pattern is approximately one-quarter of the wavelength of the incident radiation.

40. The apparatus of claim 38 wherein the conductive elements of the first and second patterns have a circular shape.

41. The apparatus of claim 38 wherein the second pattern of conductive elements is substantially identical to the first pattern of conductive elements.

42. The apparatus of claim 38 wherein the first and second directions of the first pattern of conductive elements are parallel to the first and second directions, respectively, of the second pattern of conductive elements.

* * * * *